Dec. 12, 1961     E. G. SLUKA     3,012,640
ANCHOR CLIP
Filed Sept. 20, 1955
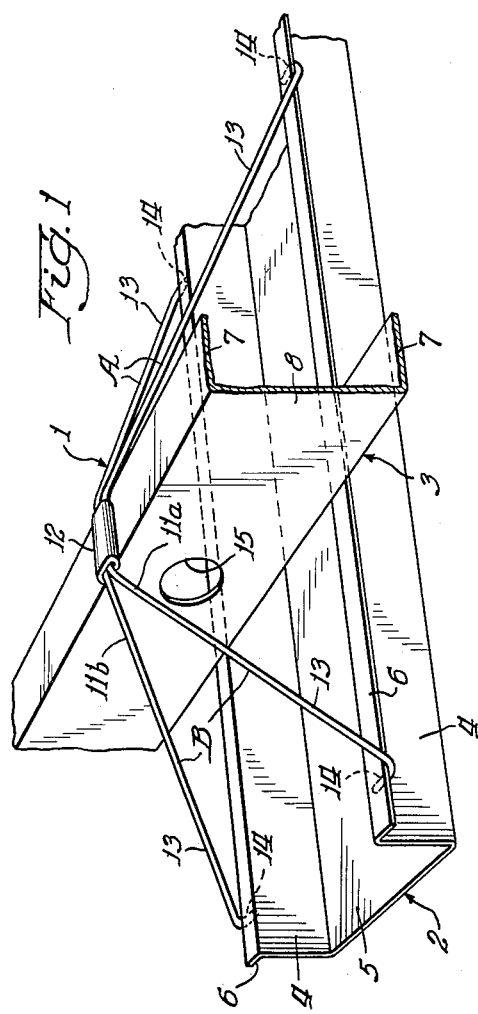
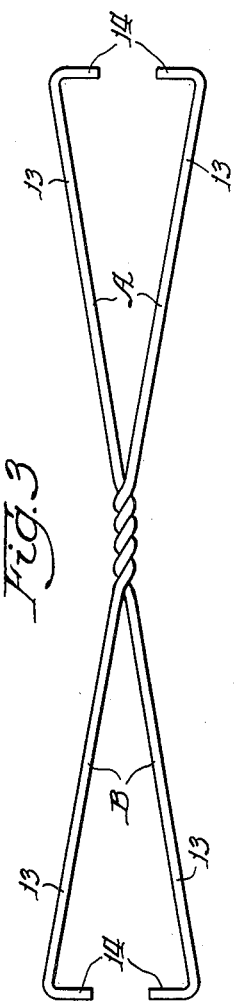
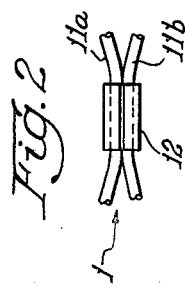
Inventor:
Edward G. Sluka
By: Hill & Hill
Attys.

United States Patent Office 3,012,640
Patented Dec. 12, 1961

3,012,640
ANCHOR CLIP
Edward G. Sluka, Chicago, Ill., assignor to Chicago Metallic Sash Co., Chicago, Ill., a corporation of Illinois
Filed Sept. 20, 1955, Ser. No. 535,375
5 Claims. (Cl. 189—35)

The invention relates generally to retaining devices, and more particularly to a retaining device for supporting suspended members and the like.

The invention has particular application in construction work such as the installation of acoustical ceiling panels and the like in connection with the suspension of furring members which usually are formed as sheet metal channels.

In the past, furring channel members have been connected to their supporting elements by clips formed from wire stock bent into the shape of a bail or U-shaped structure having a pair of spaced leg portions extending in the same general direction, connected by an intermediate portion, with the free ends of the legs being suitably formed to engage the furring channel. In practice, the clip was placed over the supporting member with the intermediate portion resting on the top of such member, the leg portions depending at each side thereof with the free ends engaged with cooperable portions of the furring channel. The proportions of such a clip are obviously very critical as they will vary with changes in size and shape of both the furring channels and the supporting members necessitating numerous different sized clips to cover the normal range of associated elements.

The present invention therefore has among its objects, the production of a simple, inexpensive, attaching clip or member for furring channels or the like identified as a bar joist clip in the trade and which is of universal application enabling the use of a single type clip in connection with different types of channels and supporting elements.

Another object is the production of such a clip which provides a comparative wide latitude in spring action to insure adequate retaining action as the channel elements, and also provide a wide range of adjustment and additional ease in installation.

A further object of the invention is the production of such a clip which when applied, exerts two forces on the supporting channel; one tending to draw the channel toward and retain in tight engagement with the supporting beam or member, and the other force tending to firmly squeeze or clamp the supported channel, eliminating any tendency of the clip to work out of operative engagement with the channel.

Many other objects and advantages of the construction herein shown and described will be obvious to those skilled in the art from the disclosure herein given.

To this end my invention consists in the novel construction, arrangement and combination of parts herein shown and described and more particularly pointed out in the appended claims.

In the drawings wherein like reference characters indicate like or corresponding parts:

FIG. 1 is a perspective view of the connection of a furring channel to a supporting beam, utilizing a clip constructed in accordance with the present invention;

FIG. 2 is a bottom plan view of the connection of the elements comprising the clip; and FIG. 3 is a plan view of a modification of the embodiment of the invention illustrated in FIGS. 1 and 2.

The present invention is illustrated in the drawings in connection with a generally U-shaped channel member and a supporting C-beam. Referring particularly to FIG. 1, the reference numeral 1 indicates generally a retaining clip constructed in accordance with the present invention, shown in operative engagement with a furring channel 2 and C-beam 3 to operatively connect the two in assembled relation.

The particular channel 2 illustrated comprises a pair of side walls 4 connected along a pair of corresponding walls by an intermediate wall 5, with the opposite edges of the side walls 4 terminating in oppositely directed, outwardly extending, longitudinal flanges 6. Likewise the beam 3 is illustrated as comprising a pair of parallel flanges 7 connected by an intermediate web 8 which is shown as extending vertically with the lower flange 7 in engagement with the flange 6 of the furring channel 2.

In the embodiment of the invention illustrated in FIG. 1, the clip 1 comprises two similar members 11a and 11b, formed from sufficiently resilient wire stock and operatively connected together intermediate their ends by a collar or clip 12, illustrated as formed from suitable material such as sheet metal and wrapped about the central portions of the members 11 as more clearly shown in FIG. 2. A generally X-shaped structure is thus formed having two pairs A and B of leg portions 13, the legs of each pair diverging from their connections at the collar 12.

In some cases it may be desired to form the connection of the members 11a and 11b integrally with one or both of the members and FIG. 3 illustrates such a construction, the clip therein illustrated otherwise being of the same construction as that illustrated in FIG. 1. It will be apparent the connection illustrated in FIG. 3 is produced by twisting the central portions of both members 11a and 11b about one another. Similarly in some cases it may be desirable to leave one member substantially straight and wrap or twist the other about the first, rather than twist both members.

The leg portions 13 terminate at their free ends in means for engaging one of the elements to be connected, such means in the embodiments of the invention illustrated in FIGS. 1 and 3 comprising projections 14, integrally formed with the members 11a and 11b, the projections on the respective legs 13 of either pair A or B operatively extending inwardly in generally opposed relation.

In FIG. 1, the projections are shown engaged with the flanges 6 of the channel 2. This type of assembly may be interlocked by suitably positioning the channel 2 relative the beam 3, following which one pair of legs 13 are sufficiently spread to permit the projections 14 thereon to snap under the flanges 6 of the channel, the intermediate portion is then extended over the beam and the other pair of legs forced downwardly and outwardly to permit the projections 14 thereon to be interlocked with the channel flanges as illustrated in FIG. 1.

It will be appreciated that due to the shape of the clip and the stress placed on the relatively resilient wire elements of the clip, when installing, the legs 13 of each pair tend to spring upwardly, thus urging the channel 2 into tight engagement with the beam 3, and at the same time each pair of legs 13 tends to spring inwardly toward each other to firmly grip or clamp the channel 2, eliminating any danger of undesired disengagement of the clip.

It will be apparent that as a clip constructed in accordance with the present invention does not have critical mounting dimensions as to the height of the object over which it is to be passed or as to the width of the channels to be employed, the legs 13 merely being sprung sufficiently to accommodate the different sizes and shapes of assemblies, a single sized clip is substantially universal for a wide range of combinations.

Likewise, as the dimensions of the clip are not dependent upon the particular shape of the supporting beam, it may be used with C-beams, I-beams, pipes, bars, etc., and where desired may readily pass through an opening such as the hole 15 in the beam 3, the legs 13 of one pair merely being brought together and passed through the opening.

It will be appreciated from the above description that the present invention offers considerable flexibility in installation, the latter being very simple, and at the same time presents maximum efficiency coupled with simplicity and low cost.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A bar joist clip for affixing transversely arranged structural elements together in which one of the elements is suspended from the other, said clip comprising a pair of relatively resilient and longitudinally extending members of a predetermined length to operatively overlie the uppermost of said structural elements at a transverse juncture of said structural elements intermediate the ends of said clip, the ends of said members diverging outwardly and formed with inturned ends for operatively engaging the suspended element, said resilient members normally lying substantially in a common plane and having sufficient resiliency for tensioning into a substantially inverted V-shape so that the suspended element is resiliently biased against the upper element at the transverse juncture thereof, the divergent ends of said resilient members resiliently biased together for operatively resiliently affixing the inturned ends thereof to the suspended element of such transversely arranged structural elements, and connecting means associated with the intermediate portions of the members for retaining the members in assembled relationship.

2. A bar joist clip as defined in claim 1, wherein said connecting means comprises a clip which encircles the respective members, said clip permitting a predetermined movement of one member relative to the other member.

3. A bar joist clip as defined in claim 1, wherein one of said members is wrapped about the intermediate portion of the other member to form the connecting means integral with said first-mentioned member.

4. A bar joist clip as defined in claim 1, wherein the intermediate portions of both members are twisted together to form the connecting means integral with both members.

5. A bar joist clip for biasing and affixing transversely arranged structural elements together, said clip comprising a pair of relatively resilient and longitudinally extending members, means associated with the intermediate portions of the members for operatively connecting the members in assembled relationship, said members being of a predetermined length adapted to operatively overlie a portion of the adjacent structural element at the transverse juncture of said structural elements with said connecting means overlying such juncture and the clip extending in the same direction as the other of said structural elements with the opposite ends of said members at each side of said connecting means diverging outwardly and formed with inturned end portions, each pair of diverging ends and the associated inturned end portions lying in a common plane, which planes in the unmounted clip substantially coincide, said members having sufficient resiliency to enable tensioning of the clip when overlaid on the adjacent structural element whereby the planes of the respective pairs of ends may diverge in the direction of said other structural element and to enable resiliently spreading of adjacent inturned ends and engagement thereat with said other structural element, at opposite longitudinal sides of the latter, with the diverging portions of said ends being operative to exert resiliently acting forces on said inturned ends tending to urge the latter toward one another and also in a direction tending to return said diverging planes into coinciding relation operative to exert clamping forces on such structural elements at the juncture thereof.

References Cited in the file of this patent

UNITED STATES PATENTS

| 814,092 | Staples | Mar. 6, 1906 |
| 1,607,711 | Walker | Nov. 23, 1926 |
| 1,941,211 | Inglee | Dec. 26, 1933 |
| 2,218,820 | Hillberg | Oct. 22, 1940 |
| 2,447,694 | Finch | Aug. 24, 1948 |
| 2,767,440 | Nelsson | Oct. 23, 1956 |
| 2,843,230 | Nellson | July 15, 1958 |

FOREIGN PATENTS

| 321,120 | France | Sept. 2, 1902 |